E. STIEREN.
Treating Chemicals.
No. 12,077.
Patented Dec. 12, 1854.
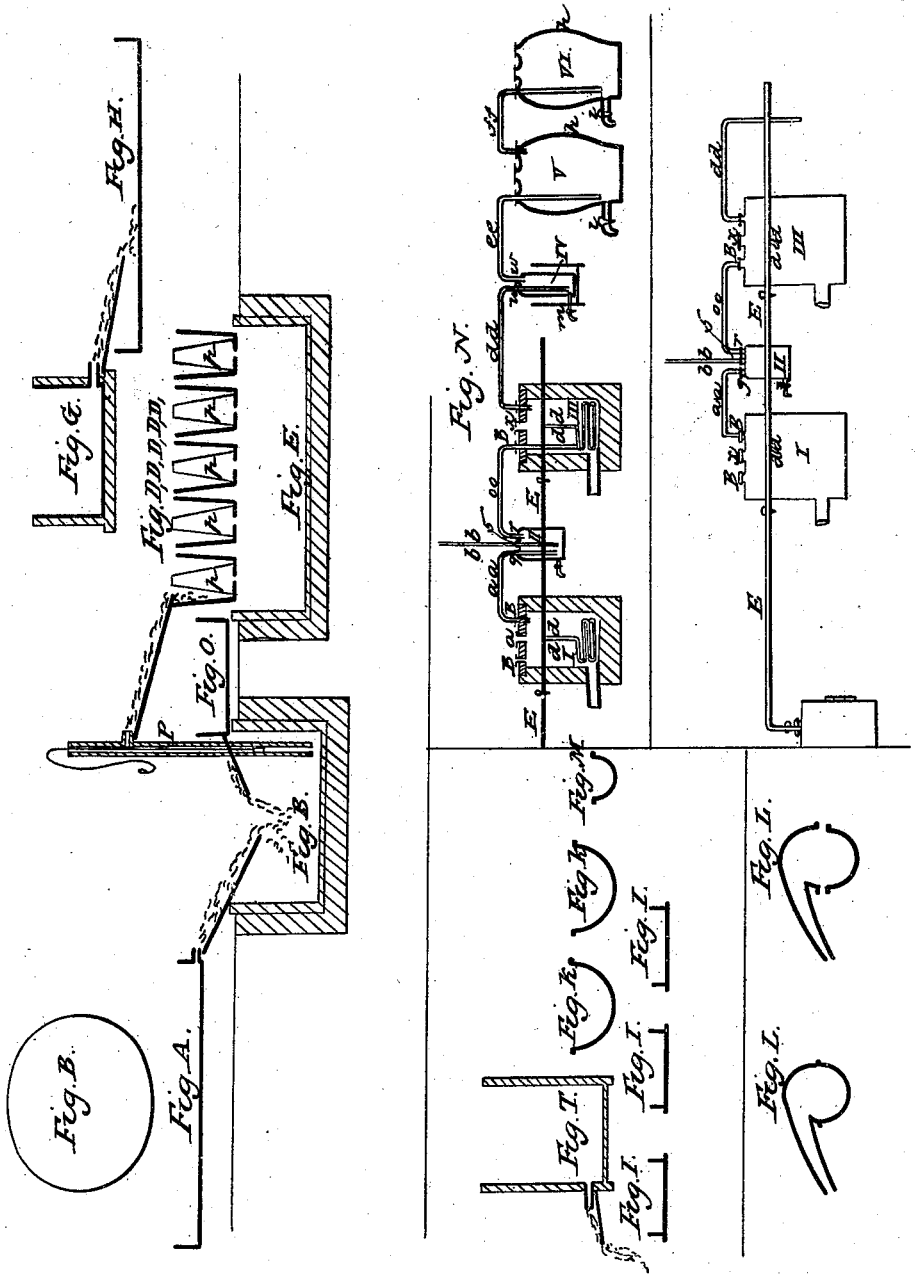
Witnesses.
Inventor:
Edward Stieren.

UNITED STATES PATENT OFFICE.

EDWARD STIEREN, OF TARENTUM, PENNSYLVANIA.

PROCESS OF TREATING THE MOTHER WATER OF SALINES.

Specification forming part of Letters Patent No. 12,077, dated December 12, 1854; Reissued June 1, 1869, Nos. 3,479 and 3,480.

*To all whom it may concern:*

Be it known that I, EDWARD STIEREN, of Tarentum, Allegheny county, in the State of Pennsylvania, have invented a new process for treating the bitter water of such of the United States salines as may be suitable for the purpose for obtaining Epsom salts or sulfate of magnesia, iodin, and bromin, and a portion of refined table-salt; and I hereby declare that the following is a full and exact description of the same.

To enable others, skilled in the science of chemistry to use my invention I will proceed to describe my process. After the extraction of the common salt of commerce, the bitter water of the salines, which is then of a density of 30° to 32° of Baumé's hydrometer, or of a specific gravity of 1.261 to 1.280, is no longer considered of any value for the manufacture of common salt, and is drawn off from the boiling pans. To obtain from water of the above strength, a lye suitable to my purpose, I put the said bitter water in a pan, and evaporate it to 36° of Baumé or a specific gravity of 1.33. This concentrated lye is drawn from the pan into a basin of suitable dimensions, made tight, and sunk in the ground; lime mixed with water to the consistence of milk, is then added, in sufficient quantities to decompose the chlorid of magnesium contained in said lye, and the magnesia is then precipitated as a hydrate. The mixture in the basin, will form a thin slush, containing chlorid of calcium, precipitated hydrate of magnesia, and combinations of bromin and iodin. This slush is drawn by means of a pump, into tubs, in the middle of each of these, there is a wooden pyramid, on the four sides of which, at suitable distances, there are a number of holes; the pyramids must be wrapped with loose woven linen, so that the slush may not escape before it is pumped out, while the liquor in which the hydrate of magnesia was suspended, may pass off by filtration through the holes; the hydrate being a denser body, remains between the pyramids and the sides of the tubs. The tubs are placed up on timbers over another basin like the first sunk in the ground, rendered tight, and of a sufficient capacity. Each of the tubs, is provided with a tap in the bottom, capable of being opened and shut. The tubs containing the pyramids being filled with the slush, drawn off from the first basin, and the taps in the tubs opened, the lye required, is drawn into the second basin, the hydrate of magnesia remaining as a denser mass. The lye then drawn off, will be a specific gravity of 1.208 to 1.261, according as more or less liquid hydrate of lime has been added. The lye being all drawn off, the taps in the bottom of the tub are again closed, water is again introduced on the hydrate of magnesia in the tubs and well stirred. After remaining some time, the taps are opened, and again closed as soon as the lye shall be drawn off. This to be repeated until the liquor drawn off from 5° to 6° of Baumé, and a specific gravity of 1.036 to 1.043. The lye which has separated from the hydrate of magnesia by filtration through the pyramids, and containing chlorid of calcium, with combinations of bromin and iodin, is pumped into a wooden vat to be used for obtaining iodin and bromin.

The hydrate of magnesia, having been washed out of the tubs, until the water flowing from them no longer contains any portion of salt, which may be known by adding to the clear filtered fluid, some drops of the solution of nitrate of silver, the water no longer turbid, and no more precipitate produced. This hydrate of magnesia is then conveyed into a leaden cistern, which for safety must be inclosed in a strong wooden box. It is then mixed with water, and stirred, and then as much diluted sulfuric acid of about 45° to 50° of Baumé, or of the specific gravity of 1.455 to 1.530 must be added until the liquor is neutralized, which may be ascertained by a paper of litmus not being tinged by it. This liquor, now a sulfate of magnesia, is suffered to remain some hours, undisturbed, so that any impurity may be deposited as sediment. After the liquor has become clear, it is drawn into a pan, and boiled, until, a sample being taken out for proof, shows a strength of 33° of Baumé, and a specific gravity of 1.295. When the liquor has attained 33° the fire is to be withdrawn, the furnace door left open, and after the liquor clears itself, it is drawn off from the pan by a siphon of lead, and then conveyed by a wooden spout, into crystallizing vessels, provided for the purpose, and put in a sheltered, cool, airy place. In cool weather the crystallization is accomplished in twenty four hours, after which time the liquor remaining on the sulfate of magnesia, is drawn off by a siphon, returned to the pan and again boiled, either by itself, or with the addition of fresh liquor, until brought to a strength of 33° of Baumé, when it is put into the crystallizing vessels as before. The crystallized salts are then put into a draining vessel in the form of an inverted cone, with numerous holes in the bottom of the small end, so that the remaining lye may be drained off, the top or larger end of the vessel, remaining open. For the purpose of drying the salts, thus collected in the draining vessel, when entirely free from the liquor, it is spread on hurdles covered with paper, and placed in summer in an open airy loft, and in winter in a close warm room. As soon as the crumbling salts become so dry as not to adhere to the fingers, they may be packed in barrels, for the purpose of commerce. Proper care must be taken, and which can only be learned by practical experience, to prevent the liquor from becoming of a dark color, or the salts being injured in appearance, and in its crystals by being exposed to a heat, too great or too quick.

I am well aware that the gas formed chlorin, as well as its solution in water, the bromin is separated from their bromids; I am also aware, that iodin has the peculiar property of forming with copper an insoluble combination in water, but the bromid and chlorid of copper are both easily dissoluble in water. Now on these facts I have based my method of extracting the bromin and iodin. From the lye separated from the hydrate of magnesia by filtration, I proceed to obtain bromin and iodin. The said lye, now contains chlorid of calcium, bromid and iodid of calcium, I add to this lye a concentrated solution of sulfate of soda, stirring the mass until the combinations are nearly all decomposed. By the decomposition aforesaid the sulfuric acid unites with the lime of the chlorid of calcium, while the oxygen of the soda of the sulfate of soda, settles to the bottom as sulfate of lime. The soda of the sulfate of soda is reduced to sodium, and unites with the chlorin of the chlorid of calcium, and forms chlorid of sodium. Other parts of the sodium unite with the iodin and the bromin, and form iodid and bromid of sodium. This mixed solution of chlorid, bromid and iodid of sodium, which remains with the sulfate of lime, soon becomes clear, and is then drawn off by a spigot, above the bottom of the vat and conveyed into an iron pan. The sediment remaining is again stirred after applying water, and the liquor when clear put into the pan, and this to be repeated until the lye is no longer worth boiling, being only from 3° to 4° of Baumé. The lye in the pan is to be boiled until the dissolved sulfate of lime begins to separate, and the chlorid of sodium shows itself by funnel shaped crystals in the boiling lye, the heat to be then reduced, and the liquor allowed to settle. It is then taken out, and suffered to cool in wooden vessels. The lye when sufficiently cooled, is next put into cast-iron kettles, of suitable dimensions, and by a quicker, but careful boiling, a pure refined table salt or chlorid of sodium is obtained. This salt which is precipitated during the boiling must be taken out by a wooden shovel, and placed in baskets over the kettles. The liquor which remains after the extraction of the salt, is now ready for use in obtaining bromin and iodin.

The liquor which remains after extracting the chlorid of sodium I put into a tight tub, of less width than height, and then add a solution containing one part of crystallized sulfate of copper, and 2½ parts of sulfate of iron (copperas), which forms a muddy precipitate. By using a solution of sulfate of copper, without the solution of sulfate of iron, it would precipitate about the half of the iodin, as basic-iodid of copper, insoluble in water, and the other half of iodin, would remain in the lye. By means of the addition of the sulfate of iron, all the iodin will be precipitated as iodid of copper, because the protoxid of iron, contained in the sulfate of iron (copperas), absorbs the oxygen of the copperoxid of the sulfate of copper, and forms sulfate of peroxid of of iron. Upon the precipitate of iodid of copper, when settled, there remains a clear brown colored liquor, which is to be drawn off and kept for further use. Then water must be put upon the precipitate, to be stirred, and when settled to be taken off the liquor, and to be mixed with the first liquor for the extraction of bromin. The precipitate must be well edulcorated with water, collected by a filter, and then dried by a moderate heat. It being then tritulated to powder, and mixed with from 1½ to 2 parts of pulverized manganese, is placed in a cast-iron retort, which is connected with a glass receiver. After the retort has been set in a firebrick furnace, at first a slow fire is applied, gradually increasing, by which in the first instance steam escapes, and is condensed to water in the receiver, and then the iodin rises as a violet colored vapor; condensing in the neck of the retort, and in the neck of the receiver, in the form of small dark gray shining metallic scales.

The liquor remaining, after the separating of the iodid of copper (iodin), and containing bromid of sodium, with chlorid of sodium, is placed in a smaller cast-iron kettle. The liquor is strongly heated, a solution of carbonate of soda, or of caustic soda, being added from time to time, until a filtered sample appears but slightly turbed. It is now boiled slowly, while crystals of chlorid of sodium, appear on the surface, and then fall to the bottom. A sample now shows after cooling, a strength of 36° Baumé, or a specific gravity of 1.33, the fire then to be removed and the door of the furnace left open. The liquor when cool, is drawn off, to be used in the extraction of bromin. The apparatus used in this latter part of the process, as of my own invention (as explained by the accompanied drafts) consists of six vessels with lead and glass pipes, and two steam pipes, which may be more fully seen by the following explanation of the draft:

Figure A, a sheet-iron pan for boiling the bitterwater, 20 feet long, from 8 to 10 feet wide, and 18 inches deep. The evaporated lye is to be drawn out, by means of a wooden spout into the basin, Fig. B, sunk in the ground. It is 6 feet in depth, and 10 feet in the smallest diameter, and 12 feet in length. This basin has a bottom of bricks, and is 18 inches thick, on a foundation of worked clay; its sides, of 9 inches bricks laid lengthwise, and built in, with the usual kind of lime and sand mortar, and also around on the outside, worked clay to the thickness of 18 inches.

Fig. C, a wooden box 8 feet long, 4 feet wide and 18 inches deep. In this box lime must be put, and slacked with water. As most of this lime cream, is to be introduced into the basin B as may be requisite, for the decomposition of the chlorid of magnesium, contained in the bitterwater, of 36° of Baumé. The slush now produced, which contains hydrate of magnesia, and chlorid, bromid and iodid of calcium is to be drawn out, by a wooden pump P, on the edulcorating or filtering-apparatus.

This apparatus, Figs. D, D, D, D, D, was invented by me. It consists of tubs and pyramids. The tubs are deep or high, 4 feet in the clear, and 3½ feet wide in the clear. In the middle of each of the tubs, there is the wooden pyramid p 4 feet and 3 inches high, 9 inches wide on top and 2 feet wide on the bottom or open end. On the four sides of the pyramids, at suitable distances, there is a number of half inch holes. These pyramids are wrapped with loose woven linen, so that the slush when pumped out, which is found between the pyramids and the sides of the tub, may not escape off itself, but the lye in which the hydrate of magnesia is suspended, so that the lye escapes, but the hydrate being a thicker body remains between the pyramids and the sides of the tubs. These tubs which have each at their bottom, a tap capable of being opened and shut, stand on the basin, Fig. E. This basin like the basin B is sunk in the ground, and is 20 feet in length by 6½ feet wide and 4½ feet deep in the clear. This like the other basin has a foundation of 18 inches of worked clay, under the bricks, and the sides formed of bricks or plank, and surrounded or inclosed, with 18 inches of worked clay. The pyramids in the tubs should be braced to keep them from shaking. This basin E used to save the lye, running down from the hydrate of magnesia. The stronger lyes, are to be pumped into the vat, Fig. F, and after to be used for making refined table salt, and for separating bromin and iodin.

After edulcorating the hydrate of magnesia, so that it contains no more adherent particles of limesalts, it is to be put, into a wooden box, lined with lead, Fig. G, and herein perfectly to be neutralized by the addition of diluted sulfuric acid. After this liquid, now a solution of sufate of magnesia or of Epsom salts, is settled, the clear lye is to be drained off into the sheet-iron pan, Fig. H. This pan is long 22 feet, wide 12 feet and deep 20 inches. The solution of Epsom salts is to be boiled down to a strength of 33° of Baumé. Then this concentrated liquid is to be put into the crystallizing vessels, Figs. I, I, I, made of wood, and tightened with a mixture of dissolved glue and lime-dust. The pan H also is to be used for boiling down the liquid, which remains after the decomposition of the lye, by sulfate of soda in vat F, now a solution of chlorid, bromid and iodid of sodium.

Figs. K, K, big kettles of cast-iron, used sometimes for purifying the (remained) colored Epsom salts lye, or, if not, for this purpose, for making pure and refined table salt. Each of these kettles is 6 feet in diameter, and about 31½ inches deep in the center, and thick in the bottom ⅝ of an inch and ¼ inch on the sides.

Fig. L, a cast-iron-retort, invented by me, to be used for extracting iodin, by the decomposition of the iodid of copper with manganese. This retort is to be cast in two parts, one upper and one under part. Each of these parts, has in the periphery a jutting out edge, which is 2 inches wide, and furnished with 8 holes, so that the two parts are to be tightened by screws. The neck of the retort is 15 inches long, and its upper part is lined inside with lead; the largest diameter in the clear by or on the open end, is 12 inches. The thickness of the iron, is on the bottom, about ⅜ of one inch, and on the other places about ¼ of one inch.

Fig. M, a smaller cast-iron-kettle to be used for boiling the remaining liquor from the iodid of copper, for preparing the same for the separation of bromin. This kettle has 3 feet in diameter, is 18 inches deep in the center, and in the bottom, ½ of one inch, thick, and $\tfrac{7}{16}$ of one inch on the sides.

Fig. N, the apparatus for separating bromin, is also invented by me. Nos. 1 and III in Fig. N, are four sided in the form of castiron-kettles inside, but worked out of fine sandstone, or of granite, or porphyry, if to be had. They are 3 feet wide and 3½ feet high outside, and 2 feet wide and 33 inches deep in the clear. No. I has a cover fitting closely, worked out of the same material as the vessels, and in the cover, there are three tubes, the middle one four inches, and each of the two others two inches in diameter. These are cut out of the same piece as the cover, and may be closed by stoppers of burnt clay. Close to the bottom there is a round hole slightly slanting, about 5 inches in diameter, into which, a cast iron-pipe, protected inside by a lining of lead, and 15 inches long, may be inserted. This pipe is 3 inches in the clear, so that the ironpipe is ¾ of an inch and the leadpipe ¼ of an inch thick. The leadpipe is surrounded inside and outside, by lead poured in a melted state into the stonevessel, and the pipe made tight in the vessel, so that the liquid in the vessel No. I may not come in direct contact with the iron pipe. This pipe, may be closed tight, by a close fitting wooden stopper.

In the cover of vessel III there also are 3 tubes, the middle one of 3 inches in diameter, and capable of being at times closed with a stopper of burnt clay; one of these is 2 inches in diameter and serves to receive a leaden pipe, the third is 1¼ of an inch wide, and is intended for the reception of a glass pipe. A short distance from the bottom of vessel No. III, there is attached in the same way, a cast-iron-pipe, lined with lead as in vessel No. I. There is also on one of the four sides of vessel No. I and No. III about 24 inches, at $d$ $d$, from the bottom, a hole 1½ inches wide, through which, a cast-iron-pipe, is fitted, and at the place where it enters the hole it is lined with lead, and from 6 to 7 inches from the bottom, there passes in a spiral manner, through the vessel, and out on the opposite side, to suffer the condensed steam to escape. The castironpipe, passing through the vessels No. I and III, must be covered with lead their whole length. The pipes are connected with a boiler by a steam pipe, at E which supplies both vessels No. I and III with the steam required.

The vessel No. II is like the other three IV, V, and VI, of earthen ware, or burnt clay. The vessel No. II has at a short distance from the bottom, a cock, and on the top three tubes each 2 inches high, the middle tube being one inch in diameter, intended to receive a glass pipe. This vessel is 18 inches high and 12 wide.

The vessel No. IV has near the bottom a cock, and on the top two short tubes, each 2 inches long, the tube is 1¼ inches wide, and serves for a glass pipe, the other tube is 2 inches in diameter, and is intended for the reception of a lead pipe. The vessel No. IV is 2 feet high and 8 inches wide. This vessel is placed in a water tight wooden vessel, which is 14 to 15 inches in diameter, and about 16 inches high. The two vessels V and VI are each 3 feet high, and two feet wide; each has near the bottom a cock $i$, and on the top, each has three tubes, 2 inches high each, and 2 inches in diameter. The two sandstone vessels I and III are coated on the outside with a heated composition of one part pitch, 3 parts coaltar, and ⅛ part of plaster of Paris, applied by means of a brush, and when the mixture is well absorbed, and dried it is fit for use. As a cement for tightening the pipes, a tenaceous mixture of powdered clay with flaxseed oil and a little plaster of Paris may be used.

In putting together the apparatus, the vessel No. I is connected with the vessel II by a lead pipe $a$ $a$ which in II reaches almost to the bottom. In vessel No. II water is put to the depth of about two inches. In the middle tube β of vessel No. II a glass pipe (called a safety pipe) 2½ feet long $b$ $b$, reaching almost to the bottom. By a lead pipe $c$ $c$, vessel II is connected with vessel III which in this vessel reaches three inches above the bottom. Vessel III is connected with IV by a glass pipe $d$ $d$ with two angles, reaches in No. IV within 1¼ to 2 inches above the bottom. The wooden vessel in which No. IV is placed, is so constructed, that cold water may flow in, and again pass out, or may hold in for the purpose of cooling. By means of a lead pipe $e$, $e$ the vessel IV is connected in the same manner, with V, as also this vessel with VI.

When all the pipes are rendered air tight, by means of the cement before described, there is put into the 4 inch tube of the vessel No. I a portion of pulverized manganese, and one part water, then the burnt clay stopper put on, and closed with cement. The vessel No. III to be filled through the 3 inch tube, with the lye containing bromin, or with the last remaining lye, two thirds of its capacity, and then the vessel well closed. The vessels V and VI, are filled with a solution of caustic soda or of carbonate of soda of about 14° to 15° of Baumé, and in V about two thirds of its capacity and in VI one half full. After this the middle tube is closed, with a burnt earthen stopper, the last tube in VI to be left open, for the purpose of expelling the atmospheric air. There is then poured into No. I through one of the 2 inch tubes which remain open 2¾ parts of muriatic acid of 19° to 20° of Baumé, or specific gravity of 1.150 to 1.160, when this tube is also to be closed by an air tight stopper, and the apparatus left for half an hour undisturbed. After this space of time, water steam must be conveyed into vessel No. I by means of the steampipe, and the same passed through for about half an hour, and then also convey watersteam into vessel No. III by the steampipe connecting with it. There will now be seen a dark red vapor passing through the glasspipe from III into IV, which in the greater part in IV is condensed as a fluid (bromin) one part also, as a gas to V and thence to VI, and there absorbed by the solution of soda. The steam must be conveyed through the mixture in vessel No. I and also without interruption through the lye in III, and continued until the vapor which goes from vessel III to IV, through the glasspipe no longer appears red colored, but clearer and approaching to yellow. The distillation will now be interrupted by shutting off the steam from the two vessels I and III, and then the stopper of the 4 inch hole in the cover of No. I is to be taken out. After the cooling of vessel No. I the wooden stopper of the iron pipe lined with lead, is to be removed, and the refuse which flows out may be used in preparing chlorid of manganese for dyeing—and cotton-printing-works.

The contents of No. II are a muriatic acid of no value, and the contents of No. III are a worthless common salt; both substances may be thrown away. The bromin in vessel No. IV condensed to a fluid, must now in order to obtain it pure, be rectified through a glass retort by fused chlorid of calcium, for the purpose of commerce, and put up in glass bottles, with concentrated sulfuric acid. The fluids in the vessels V and VI when they contain much of free or prediminent alkali, are left in both vessels, and by the next operation to be used for the purpose of absorbing the bromin. When the fluids in V and VI are saturated, and will absorb no more bromin, then boil it down in a castiron kettle to dryness, and make it red hot for a short time. This moderate nealing is done in order to decompose the bromate of soda which is formed together with the bromid of sodium, and all to make it at a bromid. The moderate nealed bromid of sodium, is to be pulverized, to be dissolved and to be evaporated to crystallization. The crystallized bromid of sodium is for the purpose of commerce, or if not, the crude nealed bromid is to be dissolved in a small quantity of water, and this solution is to be put into the vessels V and VI by the next operation.

What I claim as my invention, and for which I desire to obtain a patent, is—

The process for treating the bitterwater of such of the salines of the United States for the purpose of obtaining Epsom salts (or sulfate of magnesia), iodin, bromin, and a portion of refined table salt, using for the purpose the apparatus referred to, or any other which may be found to answer the purpose.

EDWARD STIEREN.

Signed in presence of—
H. M. BRACKENRIDGE,
B. W. BRACKENRIDGE.

[FIRST PRINTED 1913.]